United States Patent
Auld et al.

(10) Patent No.: US 10,160,880 B2
(45) Date of Patent: Dec. 25, 2018

(54) AMPHOTERIC POLYMER COMPOSITION

(75) Inventors: Kathleen A. Auld, Collegeville, PA (US); Ward T. Brown, North Wales, PA (US); Kevin J. Henderson, Phoenixville, PA (US); Anurima Singh, Midland, MI (US); Antony K. Van Dyk, Blue Bell, PA (US); Lidaris San Miguel Rivera, Midland, MI (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 1203 days.

(21) Appl. No.: 14/122,380

(22) PCT Filed: May 29, 2012

(86) PCT No.: PCT/US2012/039791
§ 371 (c)(1),
(2), (4) Date: Nov. 26, 2013

(87) PCT Pub. No.: WO2012/166691
PCT Pub. Date: Dec. 6, 2012

(65) Prior Publication Data
US 2014/0194566 A1    Jul. 10, 2014

Related U.S. Application Data

(60) Provisional application No. 61/492,561, filed on Jun. 2, 2011.

(51) Int. Cl.
| | |
|---|---|
| C09D 141/00 | (2006.01) |
| C09D 7/43 | (2018.01) |
| C09D 133/08 | (2006.01) |
| C09D 133/10 | (2006.01) |
| C09D 153/00 | (2006.01) |
| C09D 171/02 | (2006.01) |
| C08L 39/00 | (2006.01) |
| C09D 5/02 | (2006.01) |
| C08G 65/332 | (2006.01) |
| C09D 133/14 | (2006.01) |
| C09D 7/62 | (2018.01) |

(52) U.S. Cl.
CPC ....... *C09D 141/00* (2013.01); *C08G 65/3322* (2013.01); *C09D 5/027* (2013.01); *C09D 7/62* (2018.01); *C09D 133/08* (2013.01); *C09D 133/14* (2013.01)

(58) Field of Classification Search
USPC ........................................................ 524/431
See application file for complete search history.

(56) References Cited

U.S. PATENT DOCUMENTS

| | | | |
|---|---|---|---|
| 4,434,268 A | 2/1984 | Doroszkowsky et al. | |
| 4,800,034 A * | 1/1989 | Akao | B21B 45/0242 508/262 |
| 8,304,485 B2 | 11/2012 | Allen et al. | |
| 2004/0250735 A1 | 12/2004 | McIntyre et al. | |
| 2006/0142498 A1 * | 6/2006 | Gane | D21H 19/62 525/242 |
| 2008/0234411 A1 * | 9/2008 | Bobsein | C08G 18/0814 524/48 |
| 2008/0248321 A1 * | 10/2008 | Krumbacher | B05C 5/005 428/537.5 |
| 2009/0270543 A1 * | 10/2009 | Mongoin | C08F 265/00 524/426 |
| 2010/0286434 A1 * | 11/2010 | Bobsein | C08G 18/0814 560/33 |
| 2010/0298484 A1 | 11/2010 | Allen et al. | |

FOREIGN PATENT DOCUMENTS

| | | |
|---|---|---|
| DE | 2758122 A1 | 7/1979 |
| EP | 0593151 A1 | 4/1994 |
| EP | 129329 B2 | 4/1998 |
| GB | 1551126 A | 8/1979 |
| JP | 02913719 B2 | 6/1999 |

(Continued)

OTHER PUBLICATIONS

Saeed Farrokhpay "A review of polymeric dispersant stabilisation of titania pigment" Advances in Colloid and Interface Science 151 (2009) 24-32.

H. Bouhamed, et al., "Alumina interaction with AMPS-MPEG copolymers produced by RAFT polymerization: Stability and rheological behavior" Journal of Colloid and Interface Science 333 (2009) 209-220.

H. Bouhamed, et al., "Dispersion of alumina suspension using comb-like and diblock copolymers produced by RAFT polymerization of AMPS and MPEG" Journal of Colloid and Interface Science 312 (2007) 279-291.

H. Bouhamed, et al., "Alumina interaction with AMPS-MPEG random copolymers I. Adsorption and electrokinetic behavior" Journal of Colloid and Interface Science 261 (2003) 264-272.

(Continued)

*Primary Examiner* — Ling Siu Choi
*Assistant Examiner* — Thuy-Ai N Nguyen
(74) *Attorney, Agent, or Firm* — Reid S. Willis

(57) ABSTRACT

The present invention relates to a composition comprising an amphoteric polymer having pendant acid groups, or salts thereof, and pendant mono- or dialkylamino ethylene oxide groups or alkylammonium ethylene oxide groups characterized by either of the following formulas:

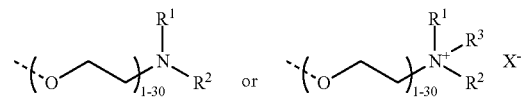

where $R^1$-$R^3$ and $X^-$ are as defined herein. The composition of the present invention improves hiding efficiency for coating compositions formulated using associative rheology modifiers, binders, and titanium dioxide.

8 Claims, No Drawings

(56) References Cited

FOREIGN PATENT DOCUMENTS

WO    2005021612  A1    3/2005
WO    2012081729  A1    6/2012

OTHER PUBLICATIONS

H. Bouhamed, et al., "Alumina interaction with AMPS-MPEG random copolymers III. Effect of PEG segment length on adsorption, electrokinetic and rheological behavior" Journal of Colloid and Interface Science 298 (2006) 238-247.
Ikuko Nishida, et al., "Effects of Adsorption Conformation on the Dispersion of Aluminum Hydroxide Particles by Multifunctional Polyelectrolytes" Langmuir 2010, 26(14), 11663-11669.
F. Touaitia, et al., "Thermomechanical properties of CaCO3-latex pigment coatings: Impact of modified dispersing agents" Progress in Organic Coatings 76 (2013) 439-446.
F. Touaitia, et al., "Impact of functionalised dispersing agents on the mechanical and viscoelastic properties of pigment coating" Progress in Organic Coatings 76 (2013) 101-106.
Yamamoto et al; A Novel Macroinimer of Polyethylene Oxide: Synthesis Ofhyper Branched Networks by Photoinduced H-Abstraction Process, European Polymer Journal, vol. 39, Issue 3, pp. 545-550, Mar. 2003.

* cited by examiner

AMPHOTERIC POLYMER COMPOSITION

BACKGROUND OF THE INVENTION

The present invention relates to an amphoteric polymeric composition useful in coatings formulations. Paints containing associative rheology modifiers such as hydrophobically modified ethylene oxide urethane (HEUR), hydrophobically modified alkali soluble emulsion (HASE), and, hydrophobically modified hydroxyethyl cellulose (HMHEC) thickeners cause titanium dioxide ($TiO_2$) particles to self-associate (crowd), which reduces hiding efficiency as compared to compositions thickened with non-associative thickeners. This crowding effect occurs because associative rheology modifiers create a network with the binder in the paint system, thereby pushing $TiO_2$ particles closer together. It would therefore be desirable to discover a way to improve the hiding efficiency of coatings formulated with associative rheology modifiers.

SUMMARY OF THE INVENTION

The present invention addresses a need in the art by providing a composition comprising an amphoteric polymer having pendant acid groups, or salts thereof, and pendant mono-or dialkylamino ethylene oxide groups or alkylammonium ethylene oxide groups characterized by either of the following formulas:

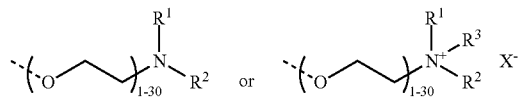

where $R^1$ and $R^3$ are each independently hydrogen or $—C_1$-$C_{12}$-alkyl; and $R^2$ is $C_3$-$C_{12}$ alkyl, and $X^-$ is a counterion.

In another aspect, the present invention is an aqueous composition comprising a rheology modifier, titanium dioxide particles, a latex binder, and a composition comprising an amphoteric polymer having pendant acid groups, or salts thereof, and pendant mono— or dialkylamino ethylene oxide groups or alkylammonium ethylene oxide groups characterized by either of the following formulas:

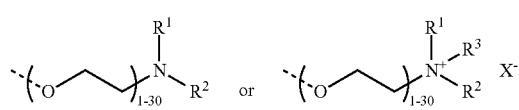

where $R^1$, $R^2$, $R^3$, and $X^-$ are as previously defined.

The present invention addresses a need in the art by providing a way to improve the hiding efficiency compositions containing $TiO_2$ and associative rheology modifiers.

DETAILED DESCRIPTION OF THE INVENTION

In a first aspect, the present invention is a composition comprising an amphoteric polymer having pendant acid groups, or salts thereof, and pendant mono- or dialkylamino ethylene oxide groups or alkylammonium ethylene oxide groups characterized by either of the following formulas:

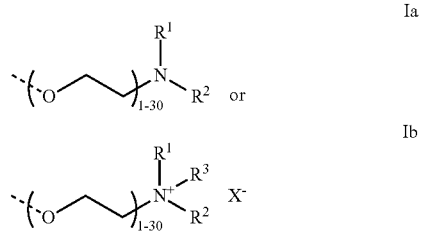

where $R^1$ and $R^3$ are each independently hydrogen or $—C_1$-$C_{12}$-alkyl; $R^2$ is $C_3$-$C_{12}$ alkyl; and $X^-$ is a counterion. Examples of suitable alkyl groups include n-propyl, n-butyl, n-pentyl, n-hexyl, n-octyl, n-decyl, and 2-ethylhexyl groups.

As used herein, the term "pendant acid groups" refers to pendant carboxylic acid, phosphorus acid, or sulfur acid groups or salts thereof; pendant sulfur acid groups refer to $S(O)_2(OH)$, $—OS(O)(OH)$, $—OS(O)(OH)$, or $—S(O)(OH)$ groups, or salts thereof, preferably structural units of one or more sulfur acid monomers, examples of which include sulfoethyl (meth)acrylate, sulfopropyl (meth)acrylate, styrene sulfonic acid, vinyl sulfonic acid, and 2-(meth)acrylamido-2-methyl propanesulfonic acid, and salts thereof, with 2-acrylamido-2-methyl propanesulfonic acid (AMPS) and salts thereof being preferred. Examples of suitable phosphorus acid monomers include dihydrogen phosphate esters of an alcohol in which the alcohol contains or is substituted with a polymerizable vinyl or olefinic group. A class of such monomers includes phosphates of hydroxyalkyl(meth)acrylates such as 2-hydroxyethyl(meth)acrylate, 3-hydroxypropyl(meth)acrylates. Another example of a phosphorus acid monomer is 2-(methacryloyloxy)ethyl-2-(trimethylammonio)ethyl phosphate. Examples of suitable carboxylic acid monomers include (meth)acrylic acid and itaconic acid.

As used herein, the term "(meth)acrylic" refers to acrylic or methacrylic; similarly, the term "(meth)acrylamido" refers to acrylamido or methacrylamido.

The term "structural units" is used herein to refer to the groups that are formed by the polymerization of the corresponding polymer. Thus, a structural unit of 2-(meth)acrylamido-2-methyl propanesulfonic acid is illustrated below:

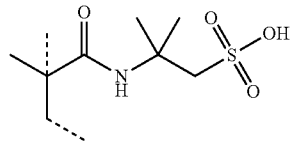

where the dotted lines indicate the point of attachment to the polymer backbone.

In one particular embodiment, the dispersant contains pendant groups having the following formula:

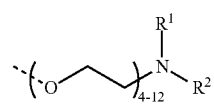

where $R^1$ and $R^2$ are each independently $C_3$-$C_8$-alkyl. In another embodiment, $R^1$ and $R^2$ are each n-butyl; and structural units of 2-(meth)acrylamido-2-methyl propanesulfonic acid.

The amphoteric polymer can be conveniently prepared by contacting together a) a dialkylamino polyethyleneoxide(1-30) (meth)acrylate monomer, preferably a dialkylamino polyethyleneoxide(3-20) (meth)acrylate monomer, more preferably a dialkylamino polyethyleneoxide(4-12) (meth) acrylate monomer, with b) an acid monomer, preferably a sulfur acid monomer, in the presence of water and a suitable initiator under polymerization conditions. The mole:mole ratio of the dialkylamino polyethyleneoxide methacrylate monomer to acid monomer is typically in range of from 1:20 to 1:1. The amphoteric polymer may also be prepared with additional monomers including (meth)acrylate, styrene, or vinyl ester monomers or combinations thereof.

It is preferred that the weight percent of the acid groups is not less than 15 weight percent, more preferably not less than 30 weight percent, most preferably not less than 50 weight percent, and preferably not more than 95 weight percent, based on the weight of the polymer. The weight average molecular weight ($M_w$) of the dispersant is typically in the range of from 1000 to 25,000 Daltons.

The amphoteric polymer of the present invention is a dispersant particularly suitable for pigments in a coating containing an associative thickener (e.g., HEUR, HASE, and HMHEC thickeners), although in principle, it can be used for non-associative thickeners such as HEC thickeners. Although not bound by theory, it is believed that the dispersant is effective in improving hiding because of its strong affinity for the surface of the $TiO_2$ and a hydrophobic portion that interacts with the hydrophobic portion of the associative thickener or latex surface. Accordingly, the dispersant of the present invention provides a network between the $TiO_2$ particle, rheology modifier and latex that creates more ideally spaced $TiO_2$ particles with concomitant improvement in hiding.

The present invention is also an aqueous composition comprising a rheology modifier, titanium dioxide particles, the dispersant of the present invention, and a latex binder. The rheology modifier may be any rheology modifier or mixtures thereof, including associative thickeners (e.g., HEURs, HASEs, and HMHECs); as well as non-associative thickeners (e.g., alkali soluble emulsions (ASEs); cellulosics such as hydroxyethylcelluloses (HECs), hydroxymethylethylcelluloses (HMECs), and hydroxypropylcelluloses (HPCs); and synthetic clays such as Laponite. The aqueous composition may also include any of a number of materials including opaque polymers; fillers; pigments, including encapsulated or partially encapsulated pigments and opaque pigments; other dispersants; other rheology modifiers; surfactants; defoamers; preservatives; flow agents; leveling agents; slip ads; and neutralizing agents.

EXAMPLES

The following examples are for illustrative purposes only and are not intended to limit the scope of the invention.

Intermediate 1

Preparation of
Dibutylamino-polyethyleneoxide(4)-methacrylate
Monomer

Methacrylic anhydride (10 g, 65 mmol.), (4-hydroxy-2,2,6,6-tetramethylpiperidin-1-yl)oxidanyl (4-Hydroxy TEMPO, 0.005 g, 0.03 mmol), and dibutylamino-polyethyleneoxide(4)-alcohol (19.8 g, 65 mmol) were added to a 2-oz glass jar and mixed. The contents of the jar were heated at 50° C. for 1 h. Analysis by $^1$H NMR spectroscopy showed 80% conversion to Dibutylamino-polyethyleneoxide(4)-methacrylate.

Intermediate 2

Preparation of
Dibutylamino-polyethyleneoxide(1)-methacrylate
Monomer

Methacrylic anhydride (10 g, 65 mmol.), (2,2,6,6-tetramethylpiperidin-1-yl)oxidanyl (4-Hydroxy TEMPO, 0.015 g, 0.10 mmol), and dibutylamino-polyethyleneoxide(1)-alcohol (11.2 g, 65 mmol) were added to a 2-oz glass jar and mixed. The contents of the jar were heated at 60° C. overnight. Analysis by $^1$H NMR spectroscopy showed near complete (>99%) conversion to Dibutylamino-polyethyleneoxide(1)-methacrylate.

Intermediate 3

Preparation of
Dibutylamino-polyethyleneoxide(20)-methacrylate
Monomer

Methacrylic anhydride (3.05 g, 20 mmol.), (TEMPO, 0.005 g, 0.03 mmol), and dibutylamino-polyethyleneoxide (20)-alcohol (20 g, 20 mmol) were added to a 2-oz glass jar and mixed. The contents of the jar were heated at 60° C. overnight. Analysis by $^1$H NMR spectroscopy showed near complete (>99%) conversion to Dibutylamino-polyethyleneoxide(20)-methacrylate.

Example 1

HEUR-Thickened Paint Composition with $TiO_2$

A. Polymer Dispersant Synthesis

2-Acrylamido-2-methylpropane sulfonic acid (12.60 g, 61 mmol), dibutylamino-polyethyleneoxide(4)-methacrylate (7.40 g, 20 mmol), 3-mercapto-1 propanol (0.20 g, 2 mmol), Vazo 56 initiator (0.22 g, 1 mmol), and DI Water (27.54 g) were added to a 100-mL round bottom four neck flask ("Flask A") with a Teflon stir bar. The contents of Flask A were dissolved and purged with nitrogen. Flask A was heated to 47.5° C. then heating was removed and the reaction allowed to exotherm to 75° C. and maintained at this temperature for 2 h. Vazo 56 initiator (0.11 g, 0.4 mmol) and DI Water (2.00 g) were added to a 1-oz vial and mixed. Flask A was heated to 82° C. and the contents of the vial were added to the flask and allowed to mix for 1 h at 82° C. Flask A was cooled to 25° C. A portion of the sample (25 g) was removed from Flask A and placed into a 4-oz jar, after which DI water (26.25 g) and ammonium hydroxide (2.36 g, 28%) were added to the contents of the 4-oz jar with stirring; the pH was measured to be 3.65 and the percent solids of the material was 21%.

B. Titanium Dioxide Dispersion

DI water (94.66 g) and the polymer dispersant from step A (28.68 g) were added to a grind pot; the grind pot was placed on a high speed dispersator and Ti-Pure R-706 $TiO_2$ (402 g) was added slowly with mixing. The contents in the grind pot were mixed at high speed for 15 min. The $TiO_2$ dispersion was filtered though a 325 mesh bag.

C. Paint with Titanium Dioxide Dispersion Containing HEUR Thickeners

RHOPLEX™ SG-10M Acrylic Latex (A Trademark of the Dow Chemical Company or its Affiliates, 55.57 g), the titanium dioxide dispersion from step B, (24.44 g, 16 pigment volume concentration (PVC)), Texanol coalescent (2.22 g), ACRYSOL™ RM-2020NPR Rheology Modifier (A Trademark of the Dow Chemical Company or its Affiliates, 1.00 g), ACRYSOL™ RM-8W Rheology Modifier (A Trademark of The Dow Chemical Company or its Affiliates, 0.13 g), and DI Water (17.05 g) were added one at a time while mixing with an overhead stirrer to a ¼-pint container and mixed for 15 min.

Example 2

HEUR-Thickened Paint Composition with $TiO_2$

A. Polymer Dispersant Synthesis

2-Acrylamido-2-methylpropane sulfonic acid (2.40 g, 12 mmol), 2-(methacryloyloxy)ethyl-2-(trimethylammonio)ethyl phosphate (1.00 g, 3 mmol), dibutylamino-polyethyleneoxide(4)-methacrylate (1.60 g, 4 mmol), 3-mercapto-1-propanol (0.05 g, 0.5 mmol), Vazo 56 initiator (0.06 g, 0.2 mmol), and DI Water (6.89 g) were added to a 25-mL round bottom four neck flask ("Flask A") with a Teflon stir bar. The contents of Flask A were dissolved and purged with nitrogen. Flask A was heated to 73° C. and held for 2 h. Vazo 56 initiator (0.03g, 0.1 mmol) and DI water (0.5 g) were added to a 1-oz vial and mixed. Flask A was heated to 82° C. and the contents of the vial were added to the flask and allowed to mix for 1 h at 82° C. Flask A was then cooled to 25° C. DI water was added to the contents of Flask A reduce solids content to 20.3% and ammonium hydroxide (28%) was added to bring the pH to 3.7.

B. Titanium Dioxide Dispersion

DI water (68.06 g) and the polymer dispersant prepared in step A (16.99 g) were added to a grind pot, which was placed on a high speed dispersator. Titanium Dioxide (Ti-Pure R-706, 230 g) was added slowly to the grind pot with mixing at a high speed for 15 min. The $TiO_2$ dispersion was filtered though a 325 mesh bag.

C. Paint with Titanium Dioxide Dispersion Containing HEUR Thickener

RHOPLEX SG-10M Acrylic Latex (55.57 g), Titanium Dioxide dispersion from step B (25.61 g, 16 PVC), Texanol coalescent (2.22 g), ACRYSOL RM-2020NPR Rheology Modifier (1.00 g), ACRYSOL RM-8W Rheology Modifier (0.13 g), and DI Water (16.55 g) were added separately to a ¼-pint container with mixing for 15 min.

Example 3

HEUR and HEC Thickened Paint Compositions with $TiO_2$

A. Polymer Dispersant Synthesis

Polymerization was done on a commercially available high throughput polymerization reactor (ScPPR reactor). Amounts and concentration of feeds included DI water: (0.717 g); 2-acrylamido-2-methylpropane sulfonic acid solution in water (5.45 g, 40 wt % solution); dibutylamino-polyethyleneoxide(1)-methacrylate solution in dimethylformamide (DMF) (1.64 g, 50 wt %) solution 3-mercapto-1-propanol in DMF (0.33 g, 9.1 wt % solution); and 2,2,-Azobis(2-methylpropionamidine)dihydrochloride in water (0.33 g, 9.1 wt % solution). The reactor cell was purged with nitrogen followed by an initial charge of water and 10% of monomer, chain transfer agent, and initiator feeds. The temperature was increased to 80° C., stirring set at 400 rpm and 10 psig of pressure of nitrogen. The remaining 90% of monomer, chain transfer agent and initiator feeds were fed in a series of automated steps over a period of 100 min. A second initiator feed, 2,2,-Azobis(2-methylpropionamidine)dihydrochloride (0.165 g, 9.1 wt % aqueous solution) was added in 1 shot and the reactor temperature was raised to 85° C. Stirring was continued for another 30 min after which time the reactor was cooled to room temperature. The pH of the reaction vial was adjusted to pH 8-9 with 28% ammonium. Polymer was precipitated in THF and dried in vacuo at 60° C. for 4 days.

B. Titanium Dioxide Dispersion

DI water (14.20 g) and the polymer dispersant prepared in step A (0.59 g) were added to a 60-g capacity mixing cup. Titanium Dioxide (Ti-Pure R-706, 39.49 g) was added to the mixing cup and mixed using a SpeedMixer mixer at a high speed for 3 min.

C. Paint with Titanium Dioxide Dispersion Containing HEUR Thickener

RHOPLEX SG-10M Acrylic Latex (111.36 g), Titanium Dioxide dispersion from step B (51.34 g, 16 PVC), Texanol coalescent (4.45 g), ACRYSOL RM-2020NPR Rheology Modifier (2.00 g), ACRYSOL RM-8W Rheology Modifier (0.26 g), and DI Water (31.64 g) were added separately to a ½-pint container with mixing for 10 min.

D. Paint with Titanium Dioxide Dispersion Containing HEC Thickener

RHOPLEX SG-10M Acrylic Latex (111.36 g), Titanium Dioxide dispersion from step B (51.34 g, 16 PVC), Texanol coalescent (4.45 g), Natrosol 250 MHR hydroxyethylcellulose (HEC, 0.86 g), and DI water (32.94 g) were added separately to a ½-pint container with mixing for 10 min.

Example 4

HEUR and HEC Thickened Paint Compositions with $TiO_2$

A. Polymer Dispersant Synthesis

Polymerization was done on a commercially available high throughput polymerization reactor. Amounts and concentration of feeds included: DI water (0.515 g); an aqueous solution of 2-acrylamido-2-methylpropane sulfonic acid solution (2.802 g, 40 wt %); dibutylamino-polyethyleneoxide(20)-methacrylate solution in DMF (4.06 g, 50 wt %); 3-mercapto-1-propanol in DMF (0.33 g, 9.1 wt %); and an aqueous solution of 2,2,-Azobis(2-methylpropionamidine)dihydrochloride (0.33 g of 9.1 wt %). The reactor cell was purged with nitrogen followed by an initial charge of water and 10% of monomer, chain transfer agent and initiator feeds. The temperature was increased to 80° C., stirring set at 400 rpm and 10 psig of pressure of nitrogen. The remaining 90% of monomer, chain transfer agent and initiator feeds were fed in a series of automated steps over a period of 100 min. A second initiator feed of aqueous 2,2,-Azobis(2-methylpropionamidine)dihydrochloride (0.165 g of 9.1 wt % solution) was added in 1 shot and the reactor temperature was raised to 85° C. Stirring was continued for another 30 min after which time the reactor was cooled to room temperature. The pH of the reaction vial was adjusted to 8-9 with 28% ammonium hydroxide solution. Polymer was precipitated in THF and dried in vacuo at 60° C. for 4 days.

B. Titanium Dioxide Dispersion

DI water (14.20 g) and the polymer dispersant prepared in step A (0.59 g) were added to a 60-g capacity mixing cup. Titanium Dioxide (Ti-Pure R-706, 39.49 g) was added to the mixing cup and mixed on a SpeedMixer mixer at a high speed for 3 min.

C. Paint with Titanium Dioxide Dispersion Containing HEUR Thickener

RHOPLEX SG-10M Acrylic Latex (111.36 g), Titanium Dioxide dispersion from step B (51.34 g, 16 PVC), Texanol coalescent (4.45 g), ACRYSOL RM-2020NPR Rheology Modifier (2.00 g), ACRYSOL RM-8W Rheology Modifier (0.26 g), and DI Water (31.64 g) were added separately to a ½-pint container with mixing for 10 min.

D. Paint with Titanium Dioxide Dispersion Containing HEC Thickener

RHOPLEX SG-10M Acrylic Latex (111.36 g), Titanium Dioxide dispersion from step B (51.34 g, 16 PVC), Texanol coalescent (4.45 g), 3.0% solution of Natrosol 250 MHR HEC (0.86 g), and DI water (32.94 g) were added separately to a ½-pint container with mixing for 10 min.

Example 5

HEUR and HEC Thickened Paint Compositions with TiO$_2$

A. Polymer Dispersant Synthesis

Polymerization was done on a commercially available high throughput polymerization reactor. Amounts and concentration of feeds included: DI water (0.386 g); aqueous 2-acrylamido-2-methylpropane sulfonic acid solution (6.696 g, 40 wt % solution); dibutylamino-polyethyleneoxide(4)-methacrylate solution in DMF (0.536 g, 60 wt % solution); 3-mercapto-1-propanol in DMF (0.33 g, 9.1 wt % solution); and aqueous 2,2,-Azobis(2-methylpropionamidine)dihydrochloride (33 g, 9.1 wt % solution). The reactor cell was purged with nitrogen followed by an initial charge of water and 10% of monomer, chain transfer agent, and initiator feeds. The temperature was increased to 80° C., stirring set at 400 rpm and 10 psig of pressure of nitrogen. The remaining 90% of monomer, chain transfer agent, and initiator feeds were fed in a series of automated steps over a period of 100 min. A second initiator feed of aqueous 2,2,-Azobis(2-methylpropionamidine)dihydrochloride (0.165 g of 9.1 wt % solution) was added in 1 shot and the reactor temperature was raised to 85° C. Stirring was continued for another 30 min, after which time the reactor was cooled to room temperature. The pH of the reaction vial was adjusted to 8-9 with 28% ammonium hydroxide. Polymer was precipitated in THF and dried in vacuo at 60° C. for 4 days.

B. Titanium Dioxide Dispersion

DI water (14.20 g) and the polymer dispersant prepared in step A (0.59 g) were added to a 60-g capacity mixing cup. Titanium Dioxide (Ti-Pure R-706, 39.49 g) was added to the mixing cup and mixed on a SpeedMixer mixer at a high speed for 3 min.

C. Paint with Titanium Dioxide Dispersion Containing HEUR Thickener

RHOPLEX SG-10M Acrylic Latex (111.36 g), Titanium Dioxide dispersion from step B (51.34 g, 16 PVC), Texanol coalescent (4.45 g), ACRYSOL RM-2020NPR Rheology Modifier (2.00 g), ACRYSOL RM-8W Rheology Modifier (0.26 g), and DI Water (31.64 g) were added separately to a ½-pint container with mixing for 10 min.

D. Paint with Titanium Dioxide Dispersion Containing HEC Thickener

RHOPLEX SG-10M Acrylic Latex (111.36 g), Titanium Dioxide dispersion from step B (51.34 g, 16 PVC), Texanol coalescent (4.45 g), 3.0% solution of Natrosol 250 MHR HEC (0.86 g), and DI water (32.94 g) were added separately to a ½-pint container with mixing for 10 min.

Comparative Example 1

HEUR-Thickened Paint Composition with TiO$_2$

RHOPLEX SG-10M Acrylic Latex (55.57g), Ti-Pure R-746 TiO$_2$ slurry (24.44 g, 16 PVC), Texanol coalescent (2.22 g), ACRYSOL RM-2020NPR Rheology Modifier (1.00 g), ACRYSOL RM-8W Rheology Modifier (0.13 g), and DI Water (17.05 g) were added separately to a ¼ pint container with mixing for 15 min.

Comparative Example 2

HEC-Thickened Paint Composition with TiO$_2$

RHOPLEX SG-10M Acrylic Latex (55.57 g), Ti-Pure R-746 TiO$_2$ slurry (24.44 g, 16 PVC), Texanol coalescent (2.22 g), Natrosol 250 MHR HEC (0.36 g), and DI Water (17.64 g) were added separately to a ¼ pint container with mixing for 15 min.

Following the Kubelka-Munk S/mil Test Method and using Equation 1 S/mil was calculated for each paint and results can be found in Table 1. The term AMPS:Amine molar ratio refers to the mole:mole ratio between the amount of AMPS and the amount of the amine added to the polymerization of the dispersant.

TABLE 1

Comparison S/mil between Examples and Comparator

| Example # | Description | Thickener | AMPS:Amine Molar Ratio | S/mil |
|---|---|---|---|---|
| 1C | Paint with Example 1C TiO$_2$ Dispersion | HEUR | 3.8:1 | 6.36 |
| 2C | Paint with Example 2C TiO$_2$ Dispersion | HEUR | 2.8:1 | 6.37 |
| 3C | Paint with Example 3C TiO$_2$ Dispersion | HEUR | 3.8:1 | 6.35 |
| 4C | Paint with Example 4C TiO$_2$ Dispersion | HEUR | 3.1:1 | 7.27 |
| 5C | Paint with Example 5C TiO$_2$ Dispersion | HEUR | 18.4:1 | 7.11 |
| 3D | Paint with Example 3D TiO$_2$ Dispersion | HEC | 3.8:1 | 7.46 |
| 4D | Paint with Example 4D TiO$_2$ Dispersion | HEC | 3.1:1 | 7.58 |
| 5D | Paint with Example 5D TiO$_2$ Dispersion | HEC | 18.4:1 | 7.52 |
| Comparative 1 | Paint with Commercial TiO$_2$ Dispersion | HEUR | — | 4.65 |
| Comparative 2 | Paint with Commercial TiO$_2$ dispersion | HEC | — | 6.60 |

Table 1 shows that the HEUR-modified paint containing the dispersant of the present invention shows a marked improvement in hiding over a paint thickened with the same HEUR but containing a dispersant outside the scope of the present invention. The improvement for HEC-modified paint is manifest but not as pronounced.

Kubelka-Munk S/mil Test Method

Two draw-downs were prepared on Black Release Charts (Leneta Form RC-BC) for each paint using a 1.5-mil Bird draw down bar and the charts allowed to dry overnight. Using a template, 3.25"×4" rectangles were cut out with an X-ACTO knife on each chart. The Y-reflectance was measured using a BYK Gardner 45" Reflectomer in each of the scribed areas five times measuring on a diagonal starting at the top of the rectangle and the average Y-reflectance recorded. A thick film draw down was prepared for each paint on Black Vinyl Charts (Leneta Form P121-10N) using a 3" 25 mil block draw down bar and the charts were allowed to dry overnight. The Y-reflectance was measured in five different areas of the draw down and the average Y-reflectance recorded. Kubelka-Munk hiding value S is given by Equation 1:

$$S = \frac{R}{X \times (1-R^2)} \times \ln \frac{1-(R_B \times R)}{1-\frac{R_B}{R}} \qquad \text{Equation 1}$$

where X is the average film thickness, R is the average reflectance of the thick film and $R_B$ is the average reflectance over black of the thin film. X can be calculated from the weight of the paint film ($W_{pf}$), the density (D) of the dry film; and the film area (A). Film area for a 3.25"×4" template was 13 in².

$$X \text{ (mils)} = \frac{W_{pf}(\text{g}) \times 1000 \text{ (mil/in)}}{D \text{ (lbs/gal)} \times 1.964 \text{ (g/in}^3\text{/lbs/gal)} \times A \text{ (in)}}$$

The invention claimed is:

1. A composition comprising an amphoteric polymer having a backbone with structural units of one or more sulfur-containing acid monomers or salts thereof, and pendant mono- or dialkylamino ethylene oxide groups or alkylammonium ethylene oxide groups characterized by either of the following formulas:

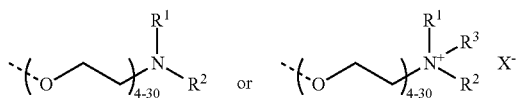

where $R^1$ and $R^3$ are each independently hydrogen, n-butyl, n-pentyl, n-hexyl, n-octyl, n-decyl or 2-ethylhexyl; $R^2$ is n-butyl, n-pentyl, n-hexyl, n-octyl, n-decyl, or 2-ethylhexyl, and $X^-$ is a counterion.

2. The composition of claim 1 wherein the weight average molecular weight of the amphoteric polymer is in the range of from 1000 to 25000 Daltons, wherein the composition is a coating composition that further comprises a rheology modifier, titanium dioxide particles, and a latex binder.

3. The composition of claim 2 wherein the structural units of the one or more sulfur-containing acid monomers are structural units of sulfoethyl (meth)acrylate, sulfopropyl (meth)acrylate, styrene sulfonic acid, vinyl sulfonic acid, or 2-(meth)acrylamido-2-methyl propanesulfonic acid, or salts thereof; and the pendant dialkyl amino ethylene oxide groups characterized by the following formula:

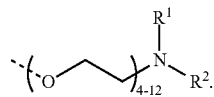

4. The aqueous composition of claim 2 wherein the rheology modifier is a hydrophobically modified ethylene oxide urethane thickener, a hydrophobically modified alkali soluble thickener, or a hydroxymethylethyl cellulose thickener.

5. The aqueous composition of claim 2 wherein the rheology modifier is a hydroxyethyl cellulose thickener.

6. A composition comprising an amphoteric polymer having structural units of one or more sulfur-containing acid monomers, or salts thereof, and pendant mono- or dialkylamino ethylene oxide groups or alkylammonium ethylene oxide groups characterized by either of the following formulas:

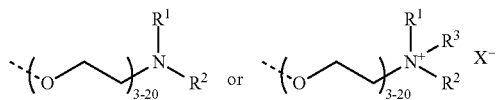

where $R^1$ and $R^3$ are each independently hydrogen, n-butyl, n-pentyl, n-hexyl, n-octyl, n-decyl, or 2-ethylhexyl; $R^2$ is n-butyl, n-pentyl, n-hexyl, n-octyl, n-decyl, or 2-ethylhexyl, and $X^{31}$ is a counterion; wherein the weight average molecular weight of the amphoteric polymer is in the range of from 1000 to 25000 Daltons; and wherein the mole:mole ratio of the structural units of sulfur acid groups or a salt thereof, to dialkylamino ethylene oxide groups is in the range of from 20:1 to 1:1.

7. A composition comprising an amphoteric polymer having structural units of a salt of 2-acrylamido-2-methyl propanesulfonic acid; and pendant dialkyl amino ethylene oxide groups characterized by the following formula:

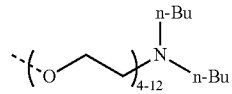

where the mole:mole ratio of the structural units of the salt of 2-acrylamido-2-methyl propanesulfonic acid, to dialkyl amino ethylene oxide groups is in the range of from 20:1 to 1:1.

8. The composition of claim 7 wherein the weight percent of the structural units of the salt of 2-acrylamido-2-methyl propanesulfonic acid is from 50 to 95 weight percent, based on the weight of the amphoteric polymer.

* * * * *